United States Patent [19]
Neumann

[11] 3,905,733
[45] Sept. 16, 1975

[54] PLASTIC WEB FORMING APPARATUS

[75] Inventor: Kurt Neumann, Wegberg, Germany

[73] Assignee: Wilhelm Leeser GmbH & Co. KG., Wegberg, Germany

[22] Filed: Nov. 26, 1973

[21] Appl. No.: 418,924

[30] Foreign Application Priority Data
Dec. 7, 1972  Germany............................ 2259834

[52] U.S. Cl. ................ 425/224; 425/440; 425/449; 425/817 C
[51] Int. Cl.² ......................................... B29D 27/04
[58] Field of Search........ 425/4 C, 817 C, 115, 116, 425/128, 129, 354, 363, 394, 395, 436, 224, 440, 447, 449, 471, 438; 264/47, 54; 164/86, 87

[56] References Cited
UNITED STATES PATENTS

| | | | |
|---|---|---|---|
| 2,668,987 | 2/1954 | Harris et al. ...................... | 164/86 X |
| 2,835,924 | 5/1958 | Schmeling......................... | 264/47 X |
| 3,020,587 | 2/1962 | Alderfer et al. .................. | 264/47 X |

Primary Examiner—Robert D. Baldwin
Assistant Examiner—Mark Rosenbaum
Attorney, Agent, or Firm—Finnegan, Henderson, Farabow and Garrett

[57] ABSTRACT

Apparatus for producing foam plastic articles by continuous extrusion in which an endless belt-like hollow former is provided, moulding material being injected through part of a longitudinal slit into the interior of the former during circulation of the latter, the arrangement being such that the edges of the slit are normally urged together.

3 Claims, 4 Drawing Figures

PATENTED SEP 16 1975     3,905,733
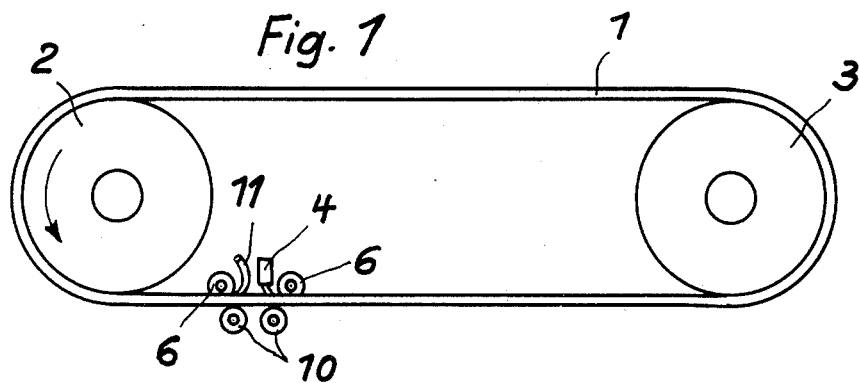
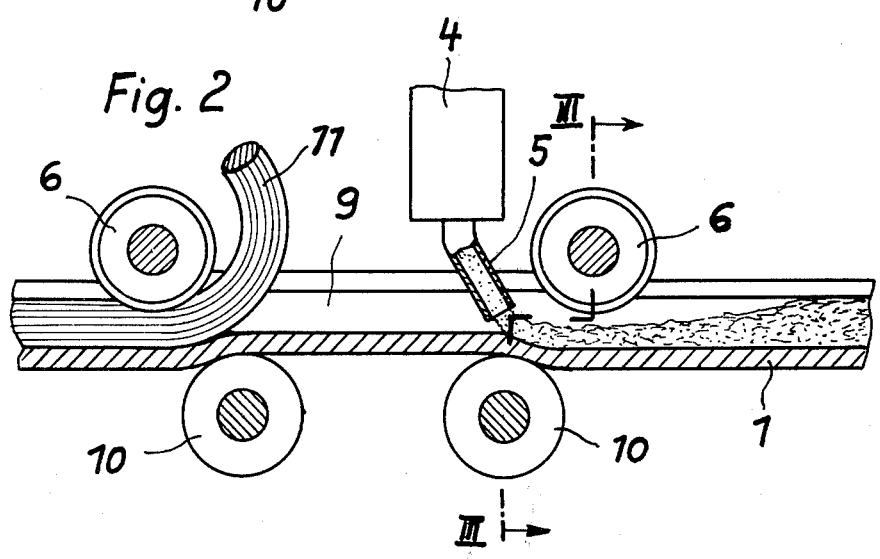
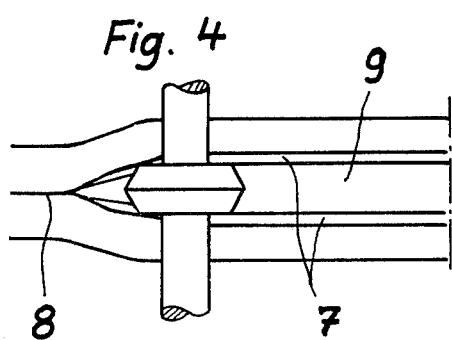
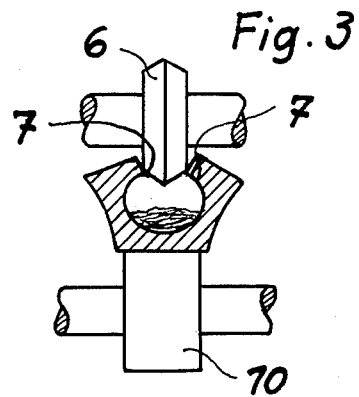

PLASTIC WEB FORMING APPARATUS

This invention relates to apparatus for continuous extrusion of foam plastic profiles, particularly polyurethane based, consisting of a form-component or belt with divided forming upper partitions travelling with the extrusion, a device projecting into the form-component feeding in the product to be formed, and means to open and close the form-component.

With a known arrangement of the above type the travelling form component is made up of a number of distinct profile form components arranged along a conveyor belt. Each of these profile form-components consists of a rigid form component secured to the conveyor with two collapsible form components closed at the approach end and opened at the discharge end by means of guides and guide-rails (DT-OS 17 87 651).

In order to produce a profile with a flat surface, this arrangement required a carrier and cover foil to be used, the foam otherwise escaping through the gaps. A further disadvantage of the arrangement is that all the opening and closing of form flaps requires a complex and costly guide system subject to constant wear and consequent maintenance. Furthermore, only the upper part of the conveyor belt can be used to form hollow profiles, the individual conveyor components forming cavities on the conveyor as they return. The lower part of the conveyor only serves to return the form components, thus remaining unutilized.

The object of the invention is consequently to provide an improved apparatus in which the foam plastic profile can be produced with simpler means and without carrier foil.

According to the present invention the form-component consists of an endless, circulating, longitudinally flexible and longitudinally slit hollow belt.

As a result of the flexible though equally bend resisting design of the form-component, the slit forming cavity can be held apart by a simple means, for instance by a spreader roll located outside the form-component and projecting into the slit, thus providing a means of feeding in the foamed plastics or to discharge the foam plastic profile. The forming cavity remains closed without external help, when the walls of the hollow belt are suitably rigid. The closure forces must be such that the foam-plastic is unable to escape through the slot. Air expelled by the foaming process must nevertheless be able to escape unhindered.

The present invention offers over and above the known procedure, the further advantage that as a result of the longitudinally flexible nature of the form-component, the forming cavity is not subjected to marked distortion in the wrap-around area, providing the return roller diameter be suitably selected. As a further feature of the invention, it is consequently possible and recommended that the opening for discharging the finished profile can be located near the opening for feeding in the foamed plastic. In this manner, the form-component can be used along the whole of its length for forming purposes, with the exception of the opening area. This means that in comparison with known arrangements with form-components operating only in the upper level of the conveyor a considerable reduction in length is achieved, the length of the forming cavity being determined according to the required forming process time and the feed rate of the foaming plastic.

The invention is described hereinafter, by way of example with reference to the accompanying drawings wherein:

FIG. 1 is a diagrammatic front view of the apparatus of the invention;

FIG. 2 is a part-longitudinal section through the form-component of FIG. 1 in the opening area, FIG. 3 is a section through the open form-component showing also the opening means, FIG. 4 is a part-plan view of the opening area of FIG. 2.

The arrangement shown in FIG. 1 consists of a hollow profile material form-component or belt 1 of flexible material guided over two return rollers 2, 3 of which roller 2 is driven by means not shown, at a constant speed in the direction of the arrow. The form-component is slit along the whole of its length on the inside.

The lower straight leg of the form-component has an injection nozzle 4 and pipe 5 projecting into the hollow forming cavity. The foaming plastic is fed through the tube 5 as shown in FIG. 2, into the forming cavity going past it at a constant speed, sufficiently to fill only part of the cavity. After a few seconds, the material begins to foam and fill up the forming cavity which has been closed in the meantime, so that the air expelled from the cavity escapes through the upper slit 8.

Depending on the expansion force of the foamed plastic profile, a greater or lesser flash is formed, though this can be easily removed from the finished product if required.

In order to introduce the spray nozzle into the forming cavity with greater ease, and allow discharge of the extrusion with greater facility, the form component 1 is spread by means of externally located and running spread rolls 6 projecting into the slit 8 to produce an opening 9. Support rollers 10 are provided for this purpose on the underside of the form-component 1. These are at a somewhat shorter distance from each other than the spreader rollers 6, to achieve better opening of the faces 7 between the two spreader rollers 6 (FIG. 4.) Whereas the nozzle tube 5 is located directly in front of the spreader roller 6, the finished foam plastic extrusion 11 is drawn upwards immediately behind the left-hand spreader roller 6 and coiled by means of an arrangement not shown here.

What is claimed is:

1. Apparatus for the continuous production of foam plastic profiles, particularly on a polyurethane basis, comprising an endless recirculating longitudinally flexible and lengthwise-slit hollow belt which is sufficiently resilient to normally urge the edges of the slit together, said hollow belt thereby providing an endless forming cavity, means for opening the slit in the belt during a portion of its length of travel to provide an opening to the belt cavity, means for feeding the foam plastic into the belt cavity through said opening, the foamed plastic profile also being discharged through said opening ahead of and adjacent to the feeding means, the opening in the belt extending from ahead of where the profile is discharged to beyond where the foam plastic is fed into the cavity with respect to the direction of travel of the belt.

2. Apparatus according to claim 1 wherein the opening of the slit is effected by externally located spreader rollers projecting into the slit in conjunction with support rollers on the underside of the belt, the support rollers being spaced at closer intervals than the spreader rollers.

3. Apparatus according to claim 1 in which the belt is guided over at least two return rollers having horizontal rotational axes, the belt being capable of retaining its cross-sectional profile shape and remaining closed while passing around said return rollers, the slit being located in the inner side of the recirculating hollow belt.

* * * * *